Dec. 26, 1933.   E. A. JOHNSTON   1,941,011
EQUALIZER CONNECTION FOR TRACK LAYING TRACTORS
Filed Dec. 2, 1931   2 Sheets-Sheet 1

Inventor
Edward A. Johnston
By N.P. Doolittle
Atty.

Dec. 26, 1933.  E. A. JOHNSTON  1,941,011
EQUALIZER CONNECTION FOR TRACK LAYING TRACTORS
Filed Dec. 2, 1931.  2 Sheets-Sheet 2
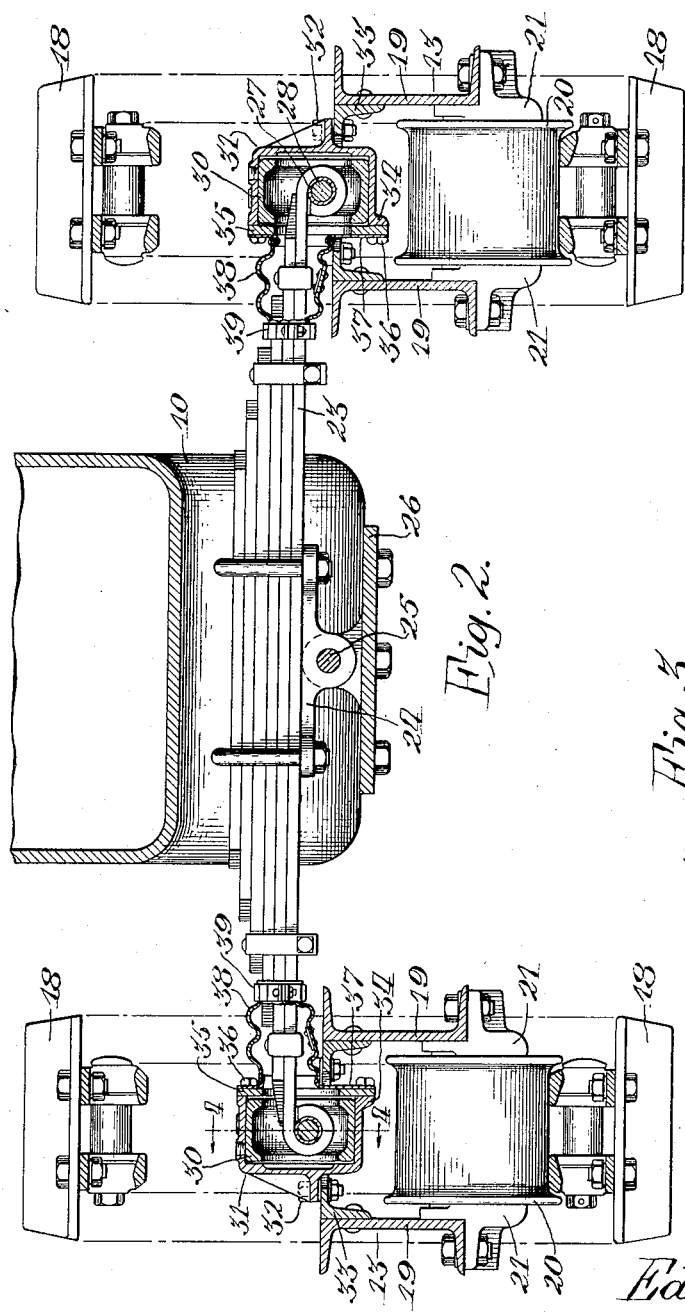
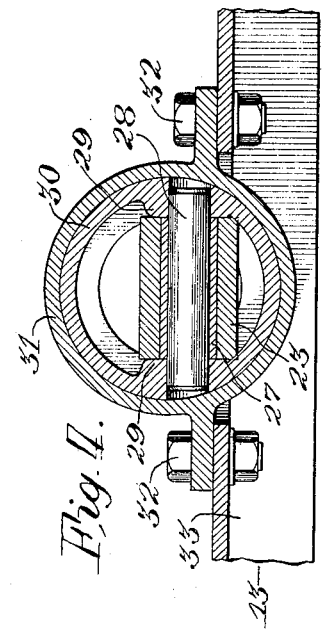
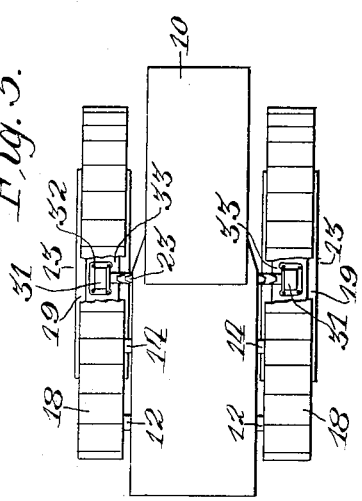
Inventor
Edward A. Johnston
By J. P. Doolittle
Atty.

UNITED STATES PATENT OFFICE 1,941,011

EQUALIZER CONNECTION FOR TRACK LAYING TRACTORS

Edward A. Johnston, Chicago, Ill., assignor to International Harvester Company, a corporation of New Jersey Application December 2, 1931. Serial No. 578,429

6 Claims. (Cl. 305—9)

This invention relates to a track laying tractor. More specifically it relates to an equalizer spring support for track laying tractors having 3-point suspension.

The principal object of the invention is to provide an improved equalizer spring support.

A more specific object is to provide a support of such nature that the track frames on which the spring rests may have free up and down movement without causing strains on the equalizer spring.

Another object is to provide an equalizer spring support permitting limited lateral movement of the track frames with respect to the equalizer spring.

Another object is to provide a connection between an equalizer spring and the track frames of an improved construction whereby the moving parts are enclosed, may be properly lubricated, and dust excluded.

The above objects and others which will be apparent from the detailed description to follow, are accomplished by a construction such as shown in the drawings, in which:

Figure 2 is a cross section on the line 2—2 of Figure 1, with certain parts of the idler mechanism omitted;

Figure 3 is a plan view of the tractor shown in Figure 1 with portions of the track broken away to show the location of parts constituting the invention; and Figure 4 is an enlarged sectional view taken on the line 4—4 of Figure 2.

Figure 1:
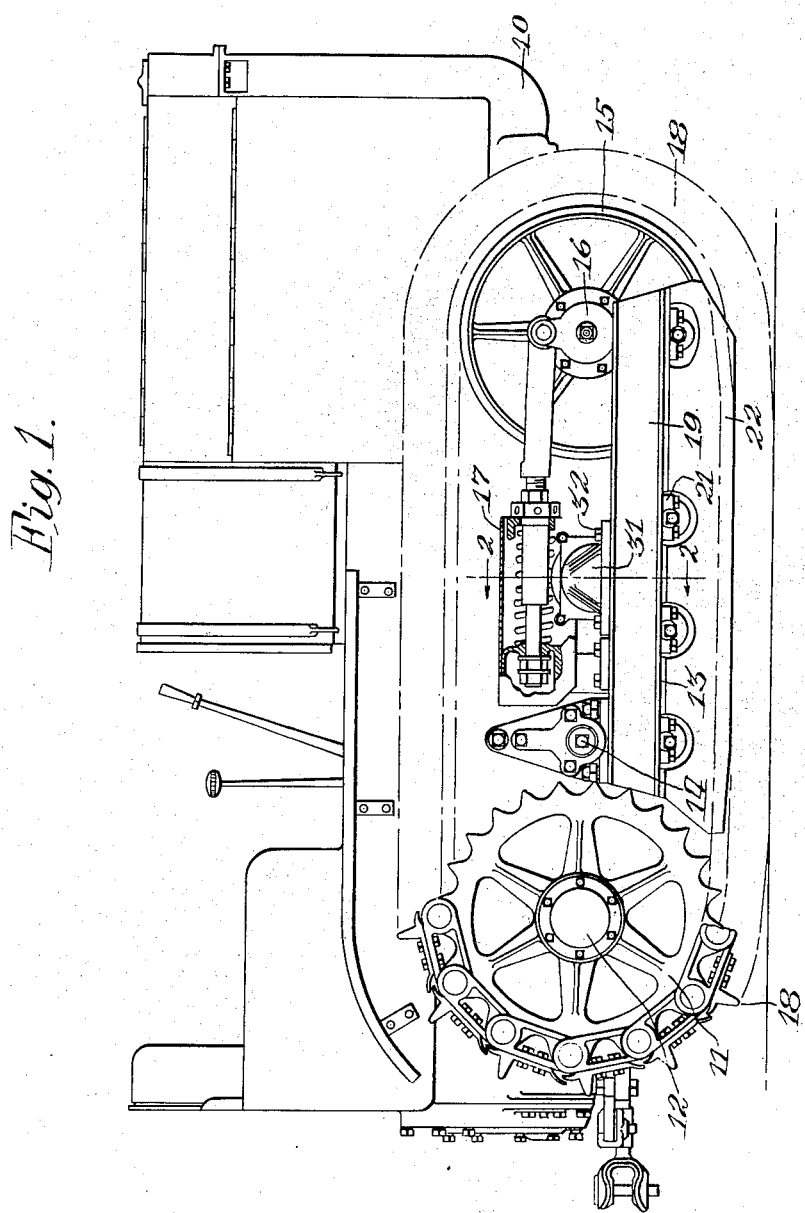
Figure 1 is a side elevation showing a track laying tractor of the type on which the invention is adapted to be utilized.

In the drawings only such parts of the tractor, which is of a conventional construction, are shown as are necessary to clearly illustrate the present invention. The tractor has a main frame 10, on which the engine, the transmission and gearing, and other parts and means for controlling the tractor are mounted. Chain sprockets 11 are mounted on shafts 12 carried by the main frame 10 and projecting laterally therefrom. A track frame 13 is pivotally mounted on transverse shafts 14 extending laterally from the main frame of the tractor. At the front end of each of the track frames an idler wheel 15 is rotatably mounted between upwardly extending links 16, which are in turn pivotally connected on a transverse axis to the forward ends of the track frames 13. A cushioned idler structure 17 is connected to the links 16 and to the track frame for resiliently maintaining the idler sprocket 15 in position. A track chain 18, consisting of links pivoted together, extends around the chain sprockets 11 and 15, being driven by the sprocket 11.

It is to be understood that the structure at each side of the tractor is exactly the same. Each track frame 13 consists in part of two longitudinally extending channel bars 19 arranged in spaced relationship with the channel portions extending outwardly. A plurality of track rollers 20 are mounted beneath the bars 19 on brackets 21 rigidly secured thereto. A shield 22 is attached to the side of the track frame covering the rollers 20 in Figure 1.

Beneath the main frame 10 forward of the center of gravity of the frame and the mechanism carried thereby a transverse support and equalizer member in the form of a spring 23 extends underneath the frame. Although in the construction illustrated the transverse support is a spring, it is to be understood that it might be formed from a rigid bar where spring action was not necessary. Said spring is secured by a bearing bracket 24 and a pin 25 to a bearing bracket 26 secured to the main frame 10. The pin 25 extends longitudinally, thereby permitting rocking movement of the spring 23 with the outer ends moving in an up and down direction. The brackets 24 and 26 may be formed to permit limited longitudinal movement of the spring in accordance with the common practice in constructions of this type.

The outer ends of the lower leaf of the spring 23 are formed into cylinders within which bearing sleeves 27 are fitted. As the construction at each end of the spring is exactly the same the description will be limited to the parts at one end. A pin 28 rotatably extends through the bearing sleeve 27 and into bosses 29 formed internally of a hollow cylindrical attaching member 30. Said member is rotatably fitted in a housing 31 formed as a casting. Said casting, as shown in Figure 3, is formed with a horizontal flange which extends forwardly, laterally and rearwardly from the housing. Said flange is secured by a plurality of bolts 32 to a channel bar 33 which is mounted within the channel bars 19 and rigidly secured thereto. The attaching member 30 is positioned with the axis of its cylindrical portion in a transverse direction, the end of the spring extending within the member through one end thereof. The bosses 29 are horizontally below the center of the member 30. Likewise the pin 28 is below the center. This construction is used to provide additional clearance for the second leaf of the spring, which may also extend within the member.

The side of the housing 31, which is adjacent the center of the tractor, is open. This construction provides for the insertion and removal of the member 30, which in effect might be termed a piston. Ears 34 at the open side of the housing 30 provide means for attaching a cover plate 35 by means of bolts 36 which extend through the cover plate and are threaded into the ears. Said cover plate is provided with a central opening of less diameter than the diameter of the member 30, whereby said member may be retained within the housing and at the same time the action of the spring end may not be interfered with.

The cylindrical chamber formed by the housing 31 and the cover plate 35, is slightly longer in a transverse direction than the length in the same direction of the member 30, whereby said member may reciprocate as a piston in said chamber as a bearing member. As previously stated, said member may also rotate within the housing. Channels are formed around the member 30 to provide for the distribution of a lubricant. A pressed steel plate 37, having a central opening and a flange outwardly extending, is also secured with the cover plate 35 by the bolts 36 and forms an abutment or stop for the piston member 30. A boot 38 of flexible material is secured to the flange of said plate and extends around the end of the spring. At a point spaced from the end of the spring said boot is secured to the spring in dust-tight relationship with respect thereto by a clamp 39. The boot has sufficient flexibility to permit the maximum angular movement of the spring with respect to the frame without undue strain upon its connecting means.

The operation of the device embodying the present invention will be clear from the detailed description. As the tractor moves over uneven ground the forward ends of the track frames rise and fall with respect to each other. To accommodate this movement it is necessary that the cross support and stabilizer, shown as the spring 23, be pivotally connected to the track frames on longitudinal axes. It is also necessary, to prevent torsional strains on the cross support that said support be pivotally connected to the track frames on transverse axes. The pins 28, by which the springs 23 are pivotally secured to the members 30 and the mounting of said members for rotation with respect to the track frame, permits the movements above referred to. In addition to providing for these relative angular movements, it is necessary to provide for slight movements of translation of the ends of the cross support with respect to the track frame, as the transverse distance between said ends varies as the cross support pivots about its longitudinal axis on the frame. This movement is taken care of by constructing the housings 31 with their internal transverse dimensions greater than the same transverse dimension of the members 30, the end wall being formed to provide a stop in one direction and the cover plate forming a stop in the other direction.

It is to be understood that applicant has shown and described only a preferred embodiment of his equalizer and stabilizer for track laying tractors and that he claims as his invention all modifications falling within the scope of the appended claims.

What is claimed is:

1. In a track laying tractor having a main frame, track frames pivotally connected to the rear of the main frame and a front supporting member connected to the main frame for angular movement with respect thereto, and in combination therewith, stabilizing connections between the supporting member and the track frames comprising attaching members pivotally secured on horizontal axes extending in the direction of the track frames to the ends of the supporting member, and casings rigidly secured to the track frames, said attaching members being rotatable about axes transverse to the direction of extension of the track frames in said casings and slidable along said axes in the casings.

2. In a track laying tractor having a main frame, track frames pivotally connected to the rear of the main frame and a front supporting member connected to the main frame for angular movement with respect thereto, and in combination therewith, stabilizing connections between the supporting member and the track frames comprising attaching members pivotally secured on horizontal axes extending in the direction of the track frames to the ends of the supporting member, and casings rigidly secured to the track frame, said attaching members being substantially cylindrical in form and mounted for rotation about axes transverse to the direction of extension of the track frames in said casings and for reciprocation along said axes in the casings.

3. In a track laying tractor having a main frame, track frames pivotally connected to the rear of the main frame and a front supporting member connected to the main frame for angular movement with respect thereto, and in combination therewith, stabilizing connections between the supporting member and the track frames comprising attaching members pivotally secured on horizontal axes extending in the direction of the track frames to the ends of the supporting member, and casings having a cylindrical bore therein rigidly secured to the track frames, said attaching members being formed as pistons rotatably mounted in said casings about axes transverse to the direction of extension of the track frames and mounted for reciprocation along said axes.

4. In a track laying tractor having a main frame, track frames pivotally connected to the rear end of the main frame and a front supporting member connected to the main frame for angular movement with respect thereto, and in combination therewith, stabilizing connections between the supporting member and the track frames comprising attaching members formed as pistons pivotally secured on horizontal axes extending in the same direction as the track frames to the ends of the supporting member, cylindrical bearing members rigidly secured to the track frames, said pistons being mounted in said members for angular movement with respect thereto about axes transverse to the track frames and for reciprocation with respect to said members along said axes, and stop means rigidly mounted on the track frames positioned to limit reciprocating movement of the pistons in both directions.

5. In a track laying tractor having a main frame, track frames pivotally connected to the rear end of the main frame and a front supporting member connected to the main frame for angular movement with respect thereto, and in combination therewith, stabilizing connections between the supporting member and the track frames comprising attaching members pivotally secured on horizontal axes extending in the same direction as the track frames to the ends of the supporting member, and casings rigidly secured to the track frames, said attaching members being rotatable about axes transverse to the direction of extension of the track frames in said casings and being mounted for reciprocation in the casings along said axes, means being provided on the casings to limit the reciprocation of said members in both directions.

6. In a track laying tractor having a main frame, track frames pivotally connected to the rear end of the main frame and a front supporting member connected to the main frame for angular movement with respect thereto, and in combination therewith, stabilizing connections between the supporting member and the track frames comprising attaching members formed as pistons pivotally secured on horizontal axes extending in the same direction as the track frames to the ends of the supporting member, and casings rigidly secured to the track frames, said casings being formed interiorly as cylinders in which the pistons are mounted for angular movement with respect to the casings about axes transverse to the direction of extension of the track frames and for reciprocation along said axes, stop means rigid with respect to the track frames being provided to limit reciprocating movement of the pistons in both directions.

EDWARD A. JOHNSTON.